United States Patent
Rumble

(10) Patent No.: US 7,246,749 B2
(45) Date of Patent: Jul. 24, 2007

(54) BRAILLE SIGNAGE

(76) Inventor: Robert Rumble, 1610 Glenburnie Road, Mississauga, Ontario (CA) L5G 3E3

( * ) Notice: Subject to any disclaimer, the term of this patent is extended or adjusted under 35 U.S.C. 154(b) by 0 days.

(21) Appl. No.: 10/244,478

(22) Filed: Sep. 17, 2002

(65) Prior Publication Data

US 2003/0183684 A1 Oct. 2, 2003

(30) Foreign Application Priority Data

Apr. 2, 2002 (CA) .................................. 2379707

(51) Int. Cl.
*G06K 19/00* (2006.01)
(52) U.S. Cl. ......................... 235/487; 283/81
(58) Field of Classification Search ................ 235/379, 235/487, 494; 283/81; 434/112–117
See application file for complete search history.

(56) References Cited

U.S. PATENT DOCUMENTS 4,404,764 A * 9/1983 Wills et al. ............... 40/124.11
4,679,342 A * 7/1987 Wilson ......................... 40/616
5,686,170 A * 11/1997 Condon et al. ............. 428/207
5,779,482 A * 7/1998 Fukumoto ................... 434/113
2003/0070909 A1* 4/2003 Sullivan ...................... 200/512

FOREIGN PATENT DOCUMENTS

| DE | 29714356 U1 | * | 6/1998 |
| GB | 2263354 A | * | 7/1993 |
| JP | 09297527 A | * | 11/1997 |
| JP | 10340049 A | * | 12/1998 |
| JP | 11129605 A | * | 5/1999 |

OTHER PUBLICATIONS

Weeks, Susan; Citibank Unveils New Automatic Teller Machine Technology to Aid Individuals With Disabilities; Sep. 30, 1992; Buniness Wire.*

* cited by examiner

Primary Examiner—Diane I. Lee

(57) ABSTRACT

A thin plastic sheet has material displaced into braille characters protruding from the front face to provide information for the blind. The plastic sheet can be a clear plastic material having information for the sighted printed on the rear side for viewing from the front. The information containing area of the plastic sheet can be formed into a decal for application inter alia to an ATM.

11 Claims, 7 Drawing Sheets

BRAILLE SIGNAGE

FIELD OF THE INVENTION

This invention in its broadest aspect relates to signage for providing information for the visually impaired or blind braille reader and, in particular, to such signage in decal form.

The invention in another aspect relates to such signage which also incorporates printed information for the sighted and, more particularly, in which the information for the sighted and the blind can occupy the same area without interference.

In a particular aspect of the invention, the invention provides sets of decals for an automated teller or transaction machine (ATM) to inform blind braille readers and sighted people what and where are the ATM functions.

BACKGROUND OF THE INVENTION

There are social and legislative pressures and requirements to provide information and guidance in braille to the blind braille reader so that such braille reader can be guided to access not only to areas such as rest rooms but also guided by instructions to operate devices such as elevators, vending machines and ATMs.

With respect to ATMs in the United States, the American with Disabilities Act requires, inter alia, that instructions and all information for use of an ATM be made accessible to and independently usable by persons with vision impairment.

In some cases, such information is given audibly using sophisticated transmitting and receiving equipment such as disclosed in U.S. Pat. No. 5,616,901.

In many instances, braille signage is provided in the form of cast metal plates or other plate material which has been suitably etched, machined or welded to provide the necessary information and guidance to the braille reader. Such signage, however, is relatively expensive and has a size such that it is not adapted to fit into and be secured to small areas.

In other cases, the buttons of an ATM are identified by braille.

To date, however, there is no signage available providing information for the blind which is low cost, yet rugged, can be configured in any shape or size can be produced to fit into limited size areas, and can be quickly and easily mounted or installed in position.

Further, there is no such signage that can combine information for the sighted as well as information for the blind.

Still further, there is no such signage that can be produced to provide sets of related pieces of information including related pieces of information for the blind and the sighted for applying to different parts or areas of a device and, in particular, to different parts or areas of an ATM.

SUMMARY OF THE INVENTION

In its broadest aspect, the invention resides in providing signage in the form of a thin layer of plastic material having material displaced forwardly of the plane of the layer at one side into braille characters.

According to a preferred form of the invention, the plastic layer has an adhesive layer applied to the side opposite to the braille side.

Again, according to a preferred form of the invention, a backing is applied to the adhesive layer and the plastic and adhesive layer are cut through to the backing to produce at least one peelable decal.

According to a preferred form of the invention, the layer of plastic material also has printed matter thereon.

Again, according to a preferred form of the invention, the plastic material is a clear plastic having a thickness of the order of about 0.008 to 0.04 inches and the braille characters formed thereon provide instructional information for the blind and the printed matter includes corresponding information for the sighted. Further, the printed matter may also include design artwork.

Again, according to the preferred form of the invention, the printed matter is printed on the side of the plastic layer opposite to the braille characters and occupies the same space as the braille characters.

Again, according to the preferred form of the invention, the plastic material comprises one of polycarbonate, polyvinyl acetate and rigid vinyl.

Again, in a particular preferred form of the invention, the plastic layer has a substantial area and has a plurality of sections of the area having characters displaced forwardly thereof on one side and printed matter printed on the opposite side relating to different instructions, the plastic layer having an adhesive applied to the printed side opposite to the braille characters and having a backing sheet to which the plastic layer is releasably secured, the plastic layer and adhesive layer being cut ("kiss cut") around the area sections through to the backing sheet to provide a series of decals ready to be peeled from the backing sheet and applied.

According to a particular preferred form of the invention, the series of decals comprise instructions to be applied to an ATM to inform the blind braille reader and sighted people what and where the ATM functions are.

Because such decals can contain the information for both the sighted and blind in the same space, they require a minimum display area thus enabling them to be of a size and shape to readily conform to the space available for presentation. As a result, for example, labels for an ATM can be configured for convenient attachment adjacent the various functions such as receipts, cash deposits and envelope outlets or receptacles.

These and other features of the invention will become apparent from the following detailed description taken in conjunction with the accompanying drawings which depict the application of the invention to a particularly beneficial use in connection with an ATM.

DETAILED DESCRIPTION ACCORDING TO THE PREFERRED EMBODIMENTS OF THE PRESENT INVENTION

Figure 1:
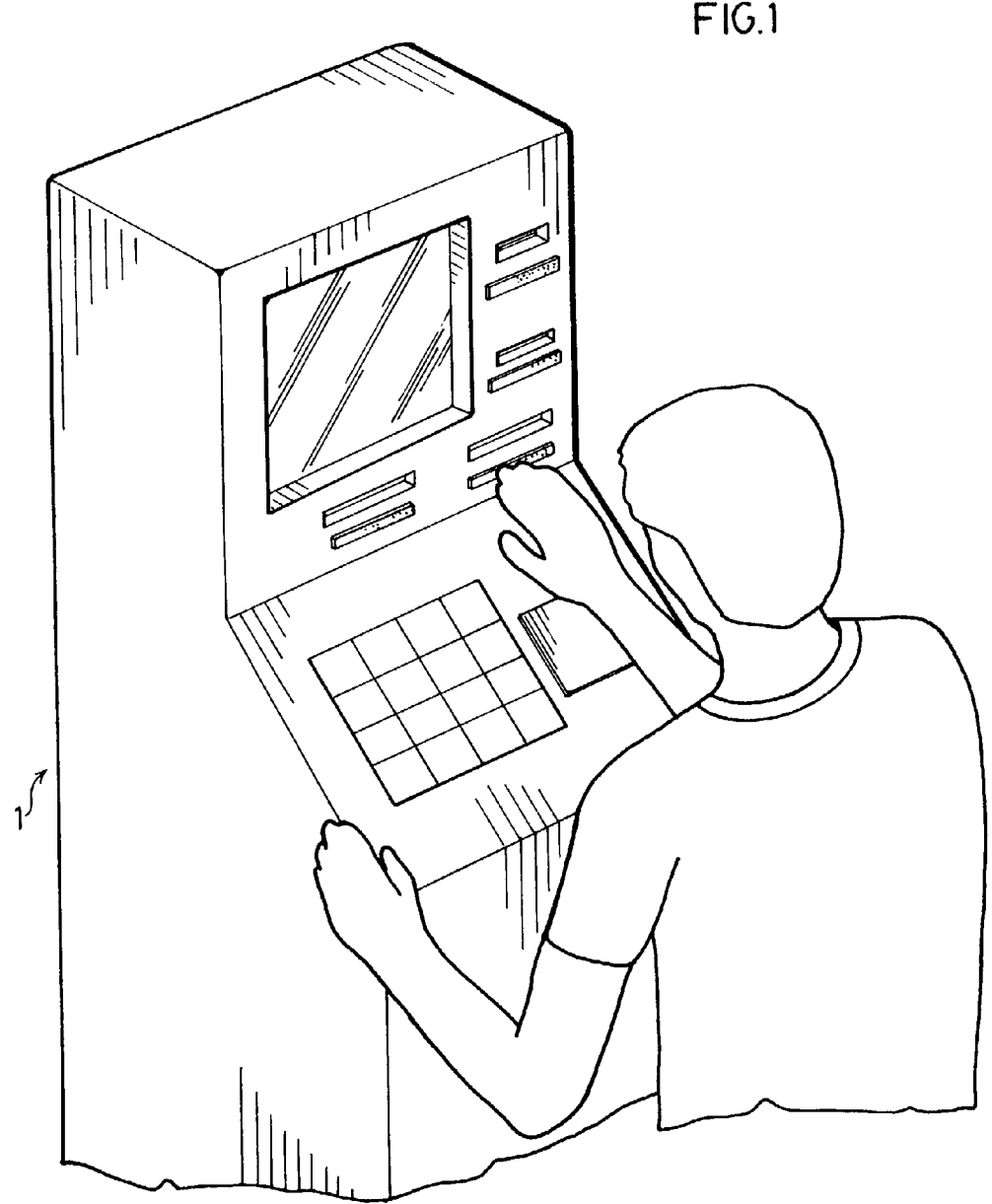
FIG. 1 is a perspective view showing a person about to use a typical ATM.

For purposes of description, the invention is hereinafter described in association with one of its most important applications, namely, to provide the requisite decals for use with ATMs, one such ATM being generally designated at 1 in FIG. 1.

According to this application of the invention, the desired decals are produced as a set so that each decal can be peeled off and applied either to an existing unmarked ATM or to a ATM at the point of manufacture.

To produce the decals, the starting point for this application is a thin sheet or layer of clear plastic material 2. A material found to be particularly useful is a thin sheet or layer of Matte Velvet clear polycarbonate having a thickness of the order of 0.008 to 0.04 inches and preferably about 0.01 inches.

Figure 2:
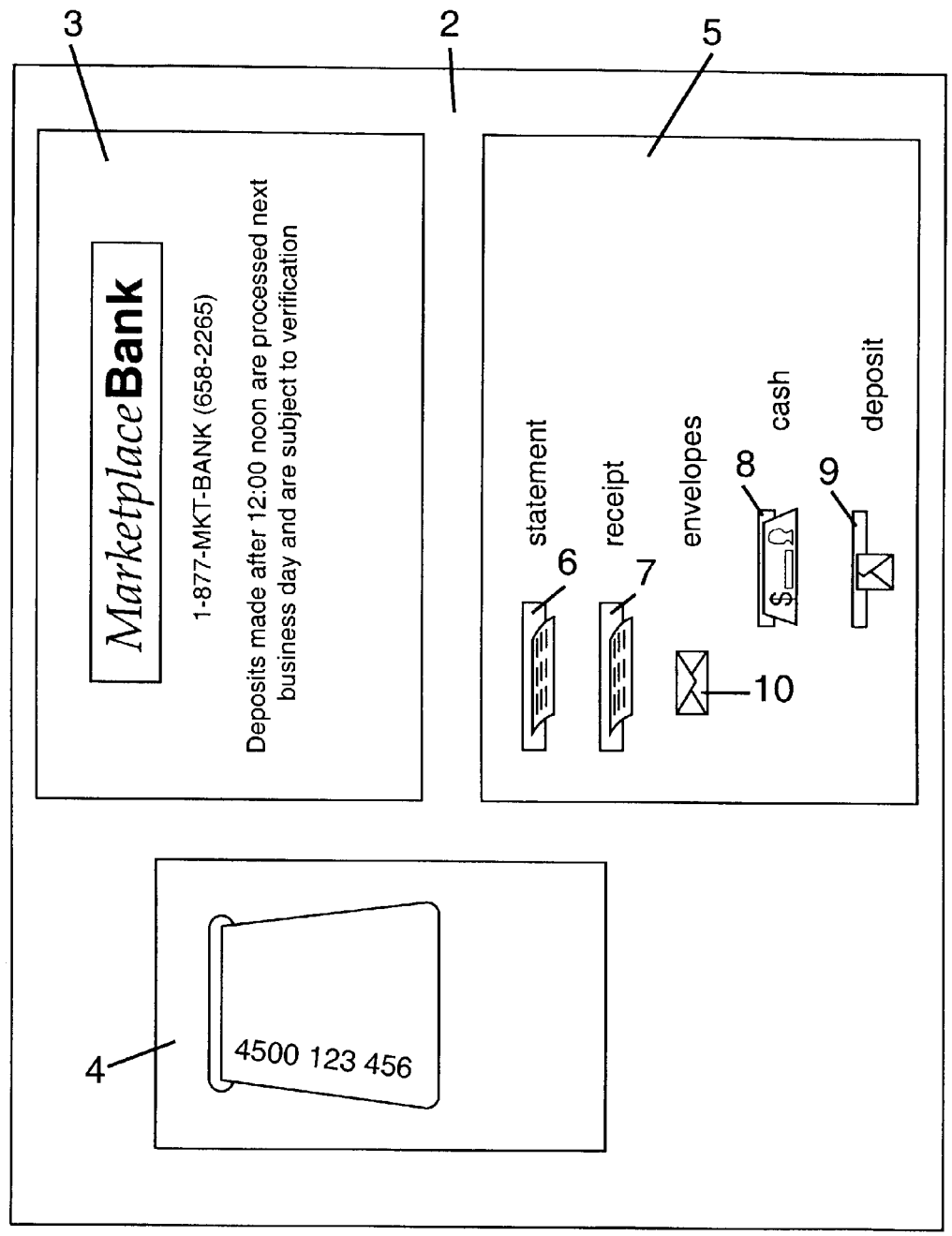
FIG. 2 is a plan view of a sheet of thin clear plastic on which has been printed information regarding a specific ATM including art work and words designating the various outlets of the ATM including the statement, receipt and cash outlets and designating the position of the envelopes and designating the deposit slot.
Figure 3:
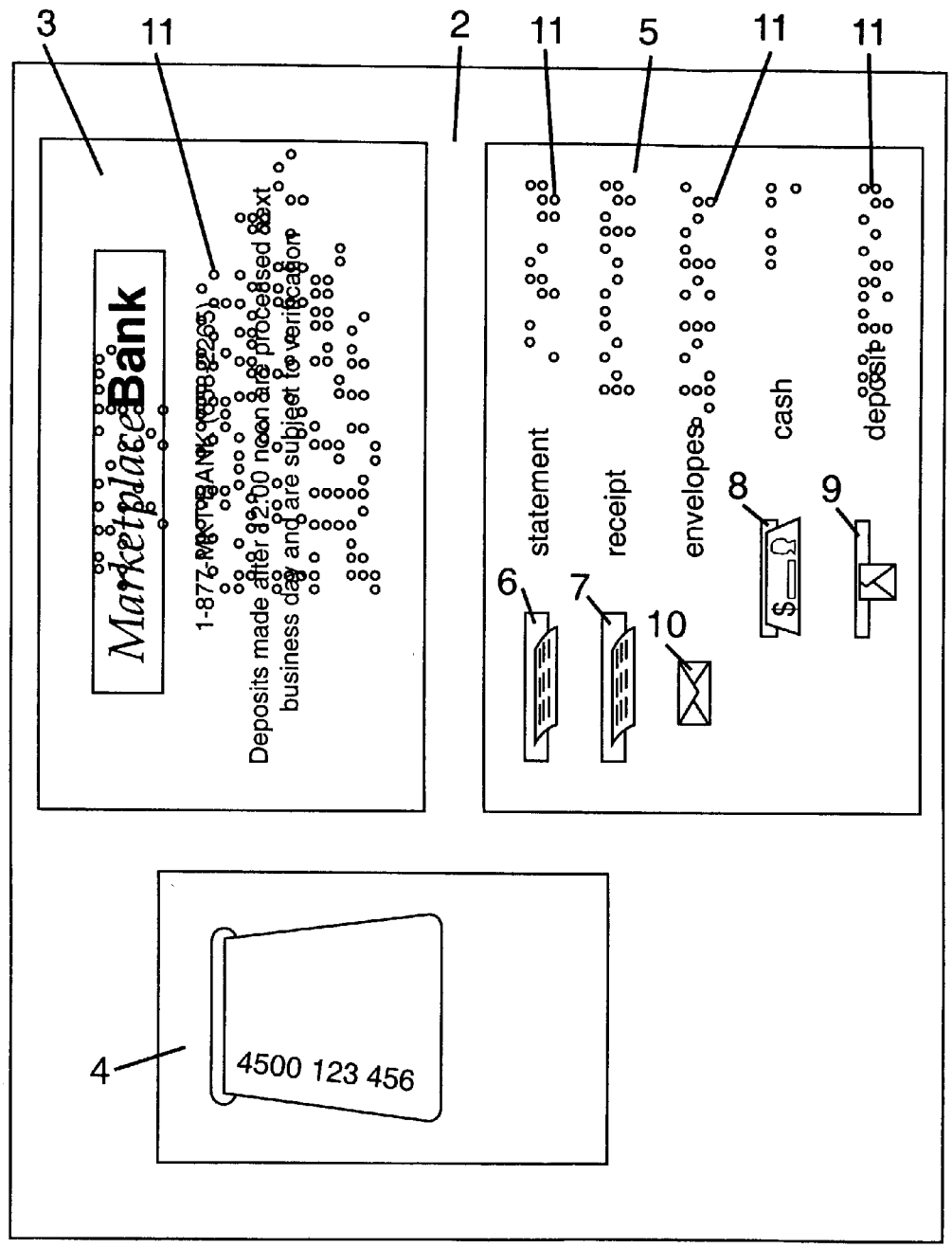
FIG. 3 is a view of the plastic sheet of FIG. 2 after it has been further processed to provide the braille characters projecting forwardly from the side of the sheet opposite to the printed information.
Figure 12:
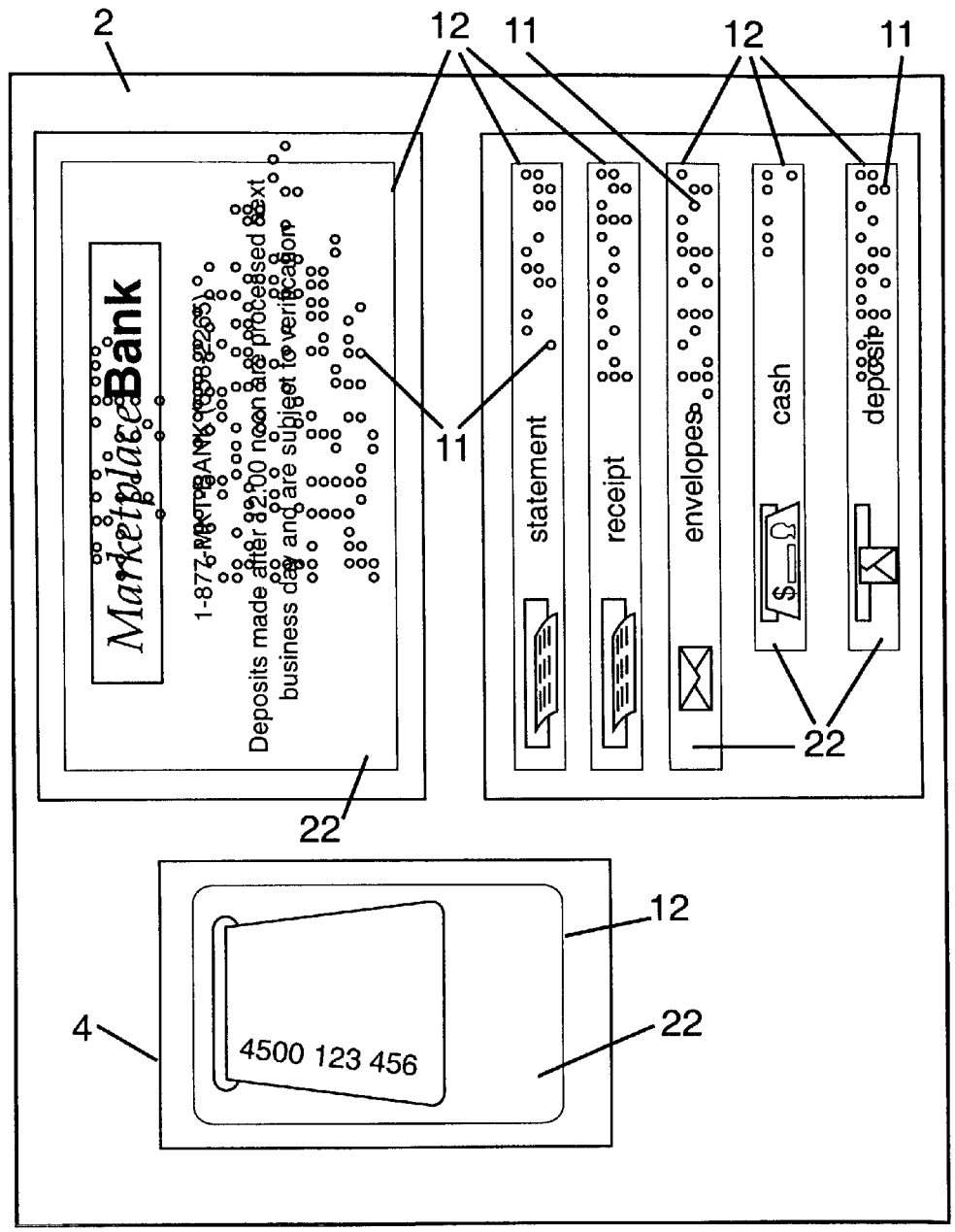
FIG. 12 is a plan view of the plastic sheet after the cutting operation of FIG. 11 showing the several decals outlined by the rectangular cuts.

As illustrated in FIG. 2, this sheet 2 then has design and written matter printed thereon with one block 3 giving bank details, another block 4 identifying the card insertion area and a block 5 giving transaction identification and description, eg. areas defined by the rectangular blocks 12 in FIG. 12.

Figure 4:
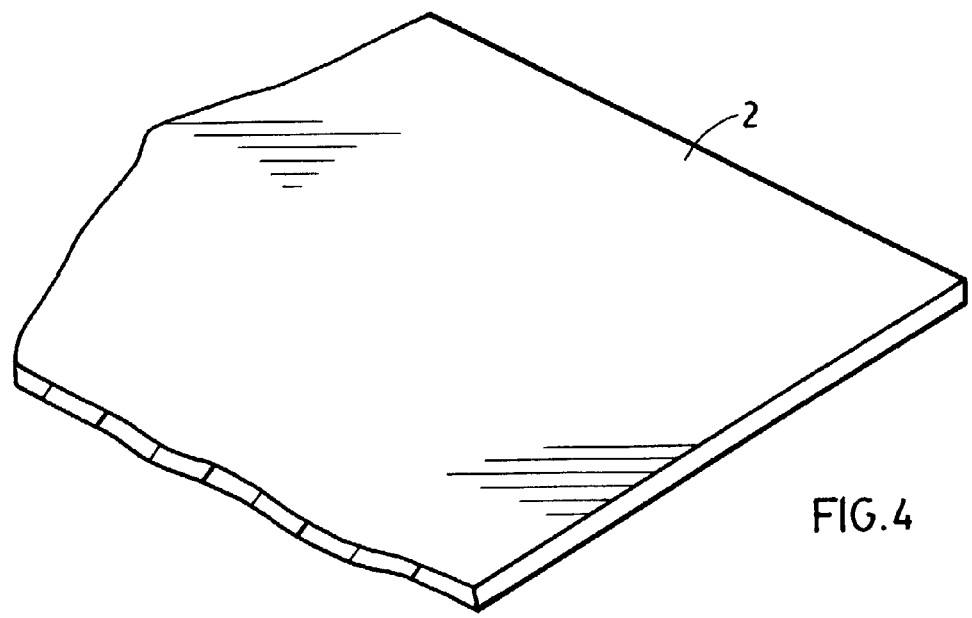
FIG. 4 is a broken away perspective view of a portion of the clear plastic sheet which is the starting point for producing the decals for the ATM.
Figure 5:
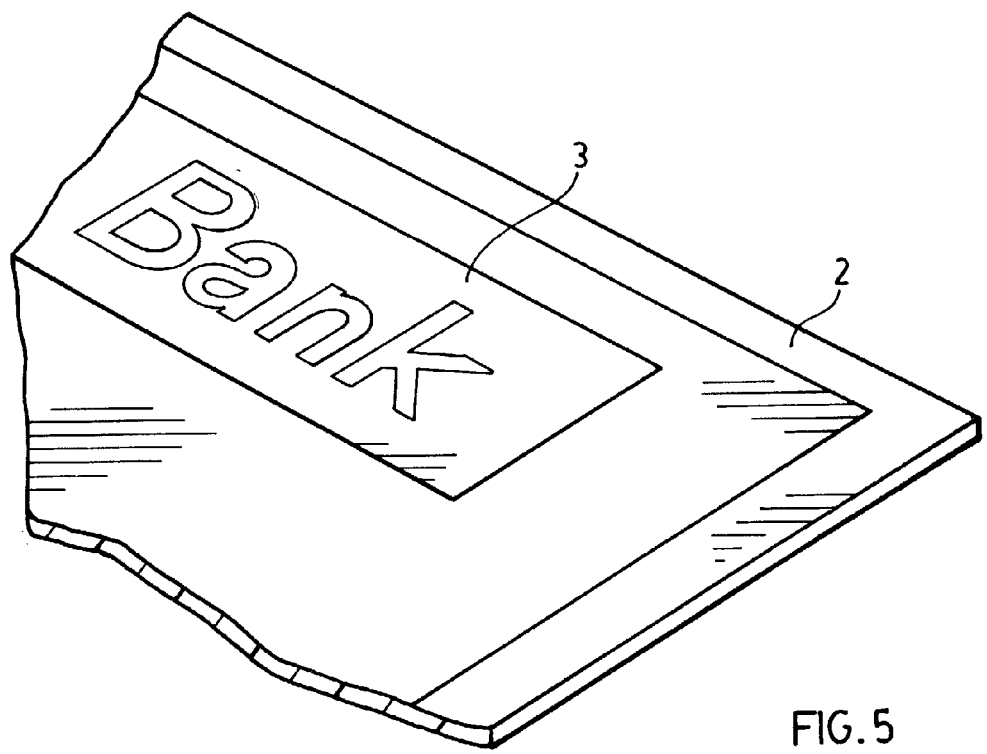
FIG. 5 shows the sheet of FIG. 4 on which matter has been printed on one side.

For purposes of illustration of the processing of the plastic sheet or layer 2 through to the decal completion, reference is had to FIGS. 4 through 12. FIG. 4 shows a portion of the sheet 2 prior to printing. FIG. 5 shows such portion having printing 3 thereon. This printing is done in reverse on the under side of the sheet 2 so that it is readable from the front side of the sheet through the clear plastic.

Figure 6:
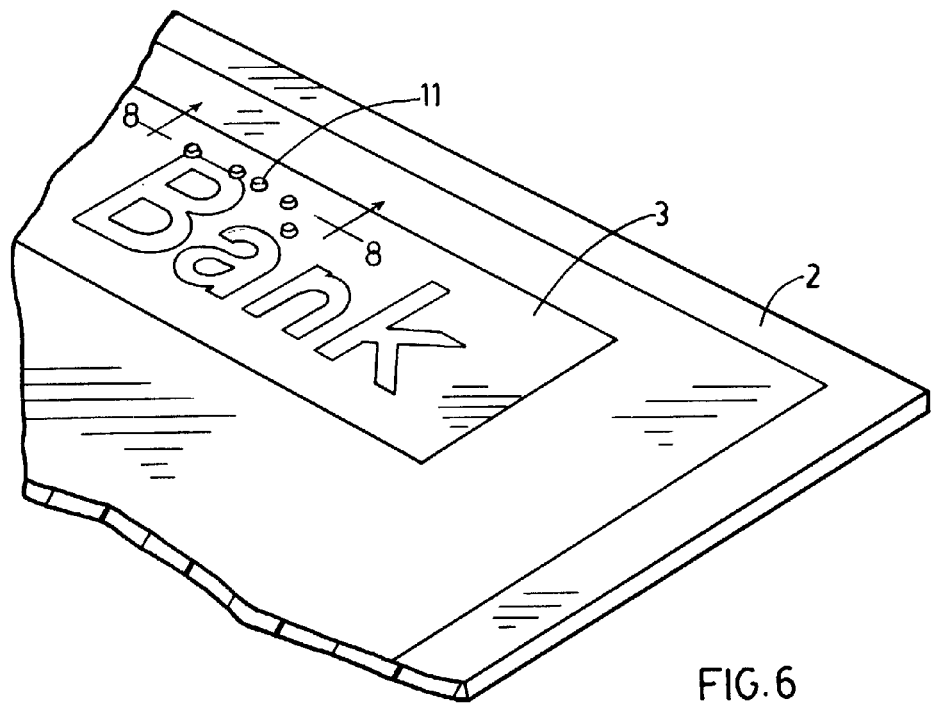
FIG. 6 shows the sheet of FIG. 5 which has been processed to provide braille thereon projecting from the side of the sheet opposite the printed side.
Figure 7:
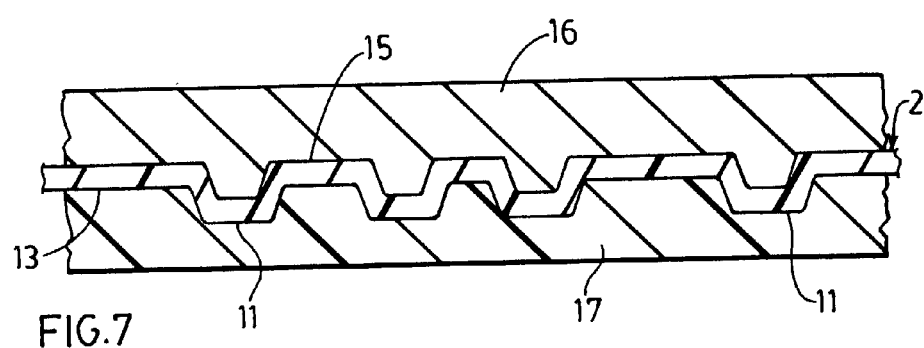
FIG. 7 is a horizontal sectional view illustrating how small portions of the plastic sheet have been displaced out of the plane of the sheet into braille characters by a male die forcing the plastic material from the rear or underside into a female die under sufficient heating to allow sufficient distortion of the plastic to produce the protrusions representing the braille characters.

FIG. 6 shows such portion having printing together with braille characters 11.

Figure 8:
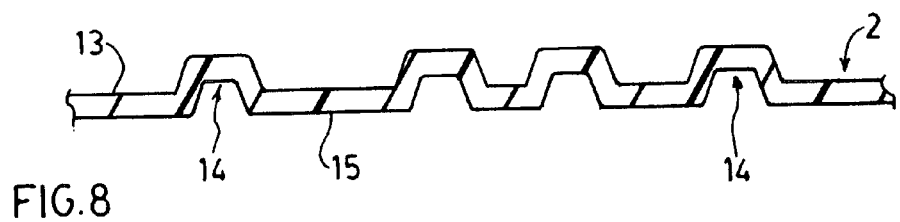
FIG. 8 is a cross sectional view taken on line 8—8 of FIG. 6 showing the protuberances representing braille characters produced by the operation depicted in FIG. 7.

As shown in FIG. 8 which is a cross section on the lines 8—8 in FIG. 6, these braille characters 11 comprise portions of the sheet or layer 2 displaced out of the plane of the sheet beyond the front face 13 of the sheet leaving spaced small voids 14 in the rear face 15 of the plastic layer. Thus, in effect, the braille characters 11 have a hollow interior. However, such small voids do not prevent clear legibility of the printed matter on the rear side of the clear plastic sheet.

In order to produce the braille characters 11, the sheet or layer of plastic 2 is placed upside down, and under the application of heat of about 200° F., a male die 16 displaces the plastic material from behind into a female die 17. This applied heat is such that the plastic material of the sheet 2 can be stretched or displaced into the female die 17 to provide the results upon completion of the sheet displacing operation shown in FIG. 7 to produce the resulting Braille characters 11 illustrated in FIG. 8. It will be understood that the dies 16 and 17 will be configured to provide the correct braille configuration as desired.

Figure 9:
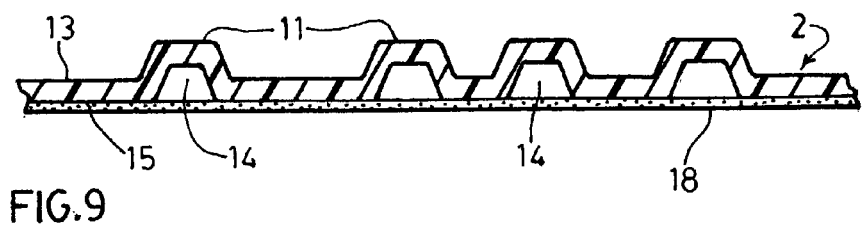
FIG. 9 illustrates the next step of the production of the decals showing the application of a layer of adhesive to the underside of a portion of the plastic sheet of FIG. 6.

Following the printing and braille forming operations, an adhesive layer 18 is applied to the back of the plastic layer or sheet 2 as illustrated in FIG. 9. Such adhesive layer 18 may, for example, be a double faced adhesive comprising a thin membrane having adhesive material on each face.

Figure 10:
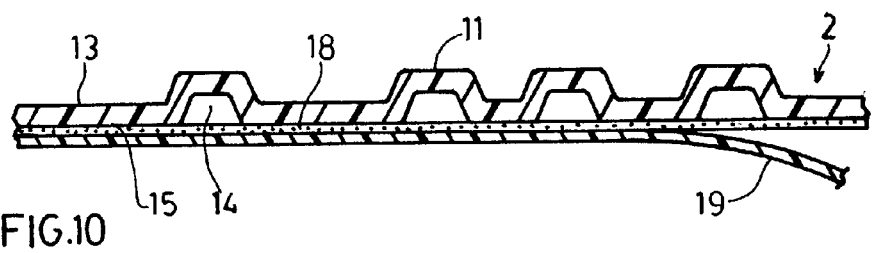
FIG. 10 is a view similar to FIG. 9 illustrating the next step of applying a suitable backing to the underside of the adhesive layer whereby the plastic sheet is releasably secured to the backing.

As shown in FIG. 10, a backing sheet 19 is applied to the underside of the adhesive layer 18. It will be understood that the backing sheet will be such that the sheet 2 with its adhesive layer 18 attached to the rear face 15 thereof can be readily peeled or released from the backing sheet 19.

Figure 11:
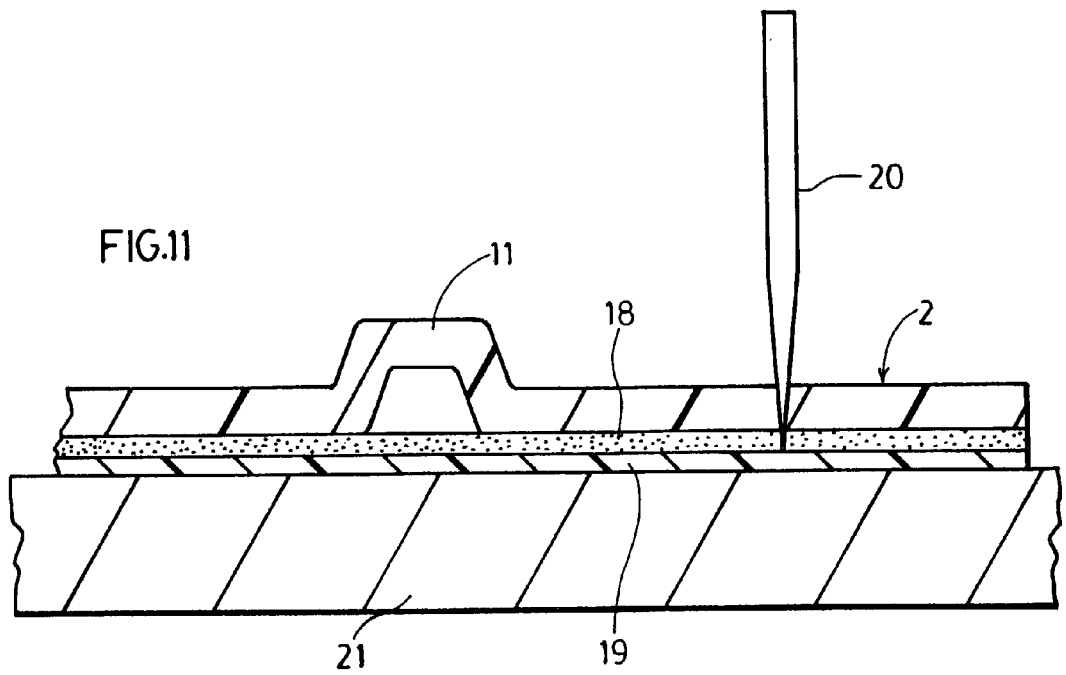
FIG. 11 is an enlarged vertical sectional view through a portion of the plastic sheet with its adhesive coated underside attached to the backing sheet and showing a cutting knife or die cutting through the plastic sheet and adhesive layer to the upper side of the backing sheet in a "kiss-cut" around the areas involving the braille and printed matter which are to become decals.

FIG. 11 illustrates the final formation of the decals in which a knife or die member 20 is provided to cut around the printed and braille information which is desired to be displayed on each decal.

This cutting takes place with the plastic layer 2 carrying the print material and the braille information and having the double faced adhesive 18 and backing sheet 19 applied thereto mounted on a suitable anvil 21.

This cutting operation is controlled to cut through the plastic 2 and adhesive layer 18 but leaving the backing sheet 19 uncut, that is, the cut out of the decals is affected by a "kiss cut" down to the backing sheet 19. Following the cutting operation, a set of decals is created each one defined by a rectangular border cut 12 as illustrated in FIG. 12.

It will be understood that each of the individual decals 22 can be peeled off separately as required and applied in the appropriate area of the ATM.

In this connection, it will be understood that each decal set and each decal 22 is type set and graphically designed to complement the surface feature of the specific ATM for which the set has been designed. The colors of the set may be selected in order to complement the corporate colors of the financial institution providing the ATM.

It will also be understood that each decal has the required measurements to match properly to the function it is to depict.

By forming the braille from the plastic material, the braille has excellent durability and, by providing both the braille and visual signs in the same area, the decals provide saving in space and money. Further, with the clear plastic, the braille does not interfere with the text information while at the same time with the printed information printed on the opposite side to the braille, that is the rear side of the plastic layer, the plastic layer forms a protective layer over the printed information.

While a particularly important application of the invention for providing decals for an ATM has been particularly described, it will be understood that economical signage embodying the invention is highly useful for many other applications. For example, if only braille is required, the plastic layer need not be a clear plastic.

It will thus be understood that other variations in the signage may be made without departing from the scope of the appended claims.

What is claimed is:

1. Signage provided with braille for the sight impaired or blind comprising a thin planar sheet of clear plastic having a front side and a rear side, said rear side having printed information for the sighted printed thereon visible through said clear plastic, said clear plastic planar sheet, in at least one area within said sheet, having displaced sheet material having printed information on the underside thereof projecting beyond said front side and forming hollow braille characters providing word information for the blind with said printed information on the rear side of said displaced sheet material being readable through said braille characters.

2. Signage as claimed in claim 1 having an adhesive layer applied to said rear side.

3. Signage as claimed in claim 2 having a releasable backing layer applied to said adhesive layer.

4. Signage as claimed in claim 3 in which said plastic sheet and adhesive layer has a cut through to said backing layer surrounding said at least one area containing braille and said printed information readable trough said braille presenting a peelable decal containing said printed information and said braille characters.

5. Signage as claimed in claim 4 having, in other areas within said sheet, displaced sheet material having printed information on the underside thereof projecting beyond said front side and forming braille characters providing word information for the blind, said plastic sheet and adhesive layer also being cut through to said backing layer surrounding said other areas to provide a plurality of decals containing printed information and braille characters.

6. Signage as claimed in claim 5 in which said braille and printed information comprise word instructions relating to functions of an ATM.

7. Signage as claimed claims 1 or 6 in which said plastic sheet has a thickness of the order of 0.008 to 0.04 inches.

8. Signage as claimed in claim 7 in which said plastic is selected from one of polycarbonate, polyvinyl acetate, and a rigid vinyl.

9. Signage as claimed in claim 7 in which said plastic sheet is a Matte Velvet polycarbonate.

10. A decal comprising a thin sheet of clear plastic material having a thickness of the order of about 0.008 to 0.04 inches and having a front face and a rear face, said rear face having printed information for the sighted visible through said clear plastics said plastic sheer having material having printed information on the rear face thereof displaced therefrom to project beyond the front face of said sheet so as to form hollow braille characters providing word information to the blind, said printed information on the rear face of said displaced sheet material being readable through said braille characters, and a layer of adhesive secured to said rear face of said plastic sheet.

11. A decal as claimed in claims 10 in which the plastic material of said plastic sheet is selected from one of polycarbonate, rigid vinyl and polyvinyl acetate.

* * * * *